United States Patent
Dona-Contero et al.

(10) Patent No.: US 7,093,998 B2
(45) Date of Patent: Aug. 22, 2006

(54) MOUNTING DEVICE

(75) Inventors: Juan M. Dona-Contero, Rubi (ES); Santiago Gimeno-Grane, Terrassa/Barcelona (ES)

(73) Assignee: Fico Triad, S.A., Rubi (ES)

( * ) Notice: Subject to any disclaimer, the term of this patent is extended or adjusted under 35 U.S.C. 154(b) by 28 days.

(21) Appl. No.: 10/335,984

(22) Filed: Jan. 2, 2003

(65) Prior Publication Data
US 2003/0198510 A1    Oct. 23, 2003

(30) Foreign Application Priority Data
Jan. 8, 2002    (DE) .............................. 102 00 376

(51) Int. Cl.
*F16C 1/26*    (2006.01)

(52) U.S. Cl. ...................... 403/309; 403/197; 403/203; 403/300; 403/328; 403/388; 74/502.4; 74/502.6

(58) Field of Classification Search ................ 403/197, 403/202, 203, 309, 314, 328, 388, 300; 74/502.4, 74/502.6; 285/140.3, 208, 307
See application file for complete search history.

(56) References Cited

U.S. PATENT DOCUMENTS

| | | | | |
|---|---|---|---|---|
| 1,432,121 A | * | 10/1922 | Prickett ...................... | 411/354 |
| 2,213,379 A | * | 9/1940 | Bird et al. .................. | 279/2.12 |
| 2,494,878 A | * | 1/1950 | Jensen ...................... | 403/409.1 |
| 3,233,496 A | * | 2/1966 | Frick et al. .................. | 411/348 |
| 3,352,576 A | * | 11/1967 | Thorne-Thomsen ..... | 285/148.2 |
| 3,561,798 A | * | 2/1971 | Redfern ...................... | 403/369 |
| 3,596,554 A | * | 8/1971 | Low et al. .................. | 411/348 |
| 4,526,411 A | * | 7/1985 | Bartholomew .............. | 285/305 |
| 4,545,691 A | * | 10/1985 | Kastan et al. ................ | 403/370 |
| 4,805,260 A | * | 2/1989 | Tooth .......................... | 411/51 |
| 5,219,188 A | * | 6/1993 | Abe et al. .................... | 285/319 |
| 5,303,963 A | * | 4/1994 | McNaughton et al. ... | 285/140.1 |
| 5,442,973 A | * | 8/1995 | Liao ............................ | 403/370 |
| 5,653,147 A | * | 8/1997 | Kelley et al. ............... | 403/197 |
| 6,231,265 B1 | * | 5/2001 | Rytlewski et al. ......... | 403/322.1 |
| 6,676,171 B1 | * | 1/2004 | Bucher et al. .............. | 285/319 |

FOREIGN PATENT DOCUMENTS

| DE | 853514 A | * | 8/1952 |
|---|---|---|---|
| DE | 2314598 A | * | 10/1973 |

* cited by examiner

*Primary Examiner*—Daniel P. Stodola
*Assistant Examiner*—Ernesto Garcia
(74) *Attorney, Agent, or Firm*—Renner, Otto, Boisselle & Sklar, LLP

(57) ABSTRACT

A mounting device (1) for mounting a component (2), preferably a Bowden cable, in or at a bore (3) or a notch (4) in a mounting wall (5), comprising a hollow cylinder (6) attached to the component (2) and insertable into the boring (3) or the notch (4), a locking element (8, 9, 10) axially movable along the hollow cylinder (6), and at least one fixing element (11) provided at the hollow cylinder (6) which can be radially expanded by the mentioned locking element (8, 9, 10) to at least partly engage in the expanded position the mounting wall (5) from behind.

16 Claims, 2 Drawing Sheets

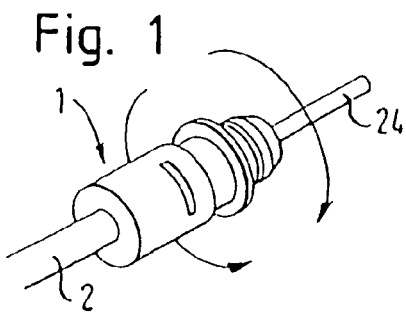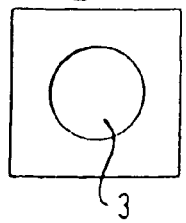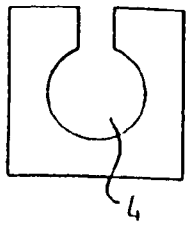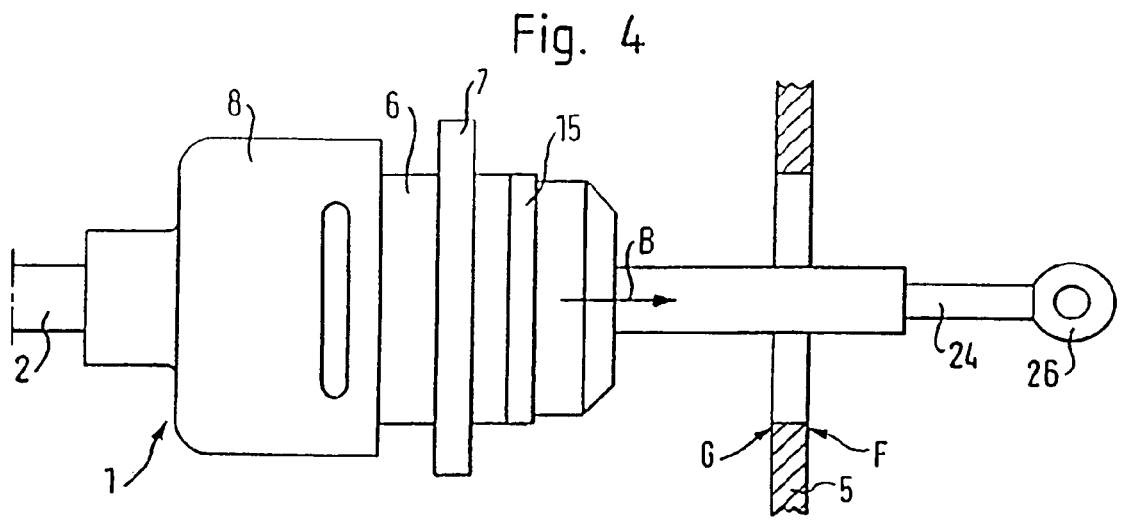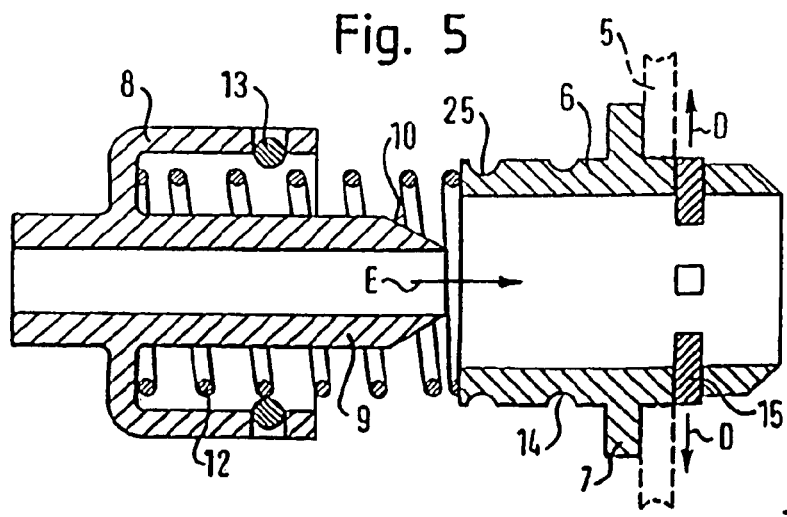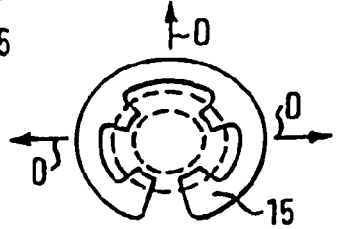

MOUNTING DEVICE

Figure 7:
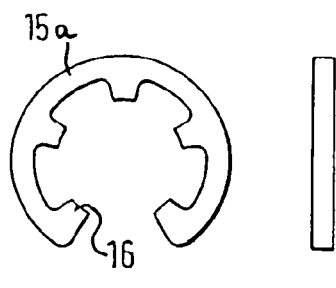

The invention relates to a mounting device for mounting a Bowden cable to a boring or a notch of a mounting wall comprising a hollow cylinder at at least one end of the Bowden cable insertable through the boring or the notch and a holding flange for mechanical contact with the mounting wall, which is rigidly connected to the hollow cylinder and radially outwardly directed.

Bowden cables are used in motor vehicles to transmit forces through heavily bent zones. The Bowden cable is at the ends mounted by a mounting device to a mounting angle, a mounting wall or the like, which is arranged in a fixed position. To this end, the mounting wall is provided with a notch or a boring through which a part shaped as a hollow cylinder can be inserted. A collar-like flange is provided at the hollow cylinder supporting the mounting device in one direction. A nut or the like can assure the fixing at the side opposite to the holding flange.

However, with mounting devices it is difficult to always maintain the correct radial position. The mounting device can easily rotate during assembly so that the assembly becomes difficult. Often the access to the area behind the mounting wall is difficult or even impossible. Further, an access from the side is often difficult or impossible.

Furthermore, these mounting devices must be designed for high pulling forces. Although there are measures known to facilitate the assembly, these measures, however, always lead to a limitation of the load transmission.

It is therefore the object of the invention to provide a mounting device according to the generic term of claim 1 which allows on the one hand a high load transmission and which is on the other hand easy to assemble.

This problem of the invention is solved by the subject-matter of claim 1, whereas advantageous embodiments of the invention are characterized in the dependent claims.

It is the core of the invention to operate an expandable fixing element by means of a cap or a similar part provided with an operating element. The expandable fixing element is arranged behind the mounting wall and can therefore engage the mounting wall from behind. The advantage is that an access from behind or from the side is not necessary at all. The mounting device is almost mounted automatically simply by inserting it. By means of the expandable fixing engaging the mounting wall from behind, the mounting device is rigidly connected to the mounting wall and so that it can take up high loads. Thus, the mounting device is in a simple manner easy to assemble and secure without the risk of rotation during assembly. A rotation of the Bowden cable is, for example, undesired, if the pulling cable carries a fixing eyelet which is to be arranged in a certain plane.

A particularly simple embodiment of the operating element is obtained, if the operating element is an operating mandrel having a conical operating surface. It is particularly advantageous, if a spring element is arranged between the cap and the hollow cylinder and if the cap is in a locking manner arranged at the hollow cylinder, wherein the locking occurs only in the position in which the fixing element is expanded. This allows to recognize immediately whether the mounting device is completely mounted or not. If the mounting device is not completely mounted, the spring or the spring element pushes the cap away from the hollow cylinder. Only in the case that the cap is correctly locked, the cap is not pushed away. Furthermore, the mounting device can by means of the spring element be substantially easier detached without the destruction of components.

A particularly easy to assemble and reliable construction is obtained, if at least one clip element is integrated in the cap for locking to the hollow cylinder, which is shaped such that it can engage a recess arranged at the hollow cylinder.

It is preferred, if the fixing element is provided as an expanding ring. Such expanding rings are common and, for example, known under the term Simmering. The easy expansion and a secure mounting are, for example, improved, if ridges directed to the inside, star-like arranged supporting angles or supporting ridges, an ear-shaped section or a centrally arranged zone of weaker material are provided.

It is also particularly advantageous, if the fixing element is provided as at least one expanding tap, in particular, if the expanding tap is made from a U-shaped recess. Preferably, the tap is provided with an operating projection for expansion, and the operating projection is arranged in such a manner in the cavity of the hollow cylinder that it contacts an operating surface of the operating element. A reduced number of necessary components is thereby obtained. The mounting tap is then part of the hollow cylinder.

Figure 8:
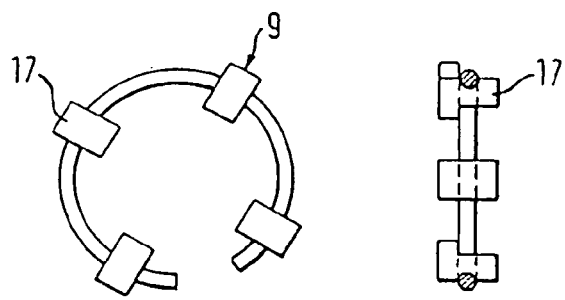
Figure 10:
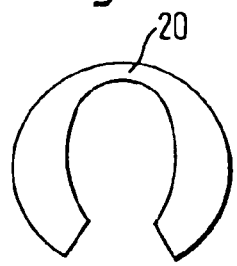
Figure 9:
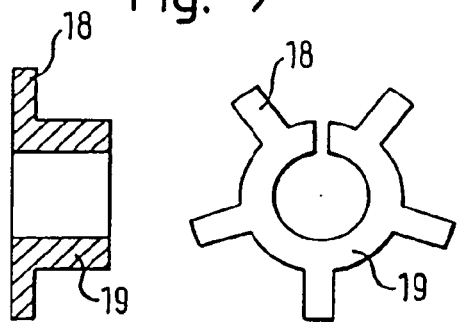
Figure 11:
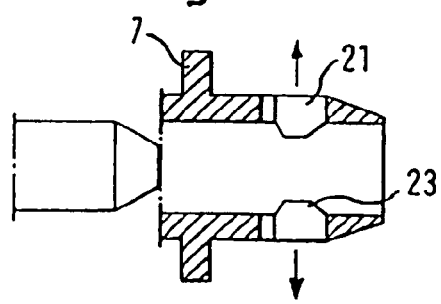
Figure 13:
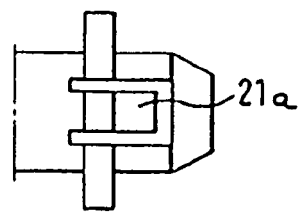
Figure 12:
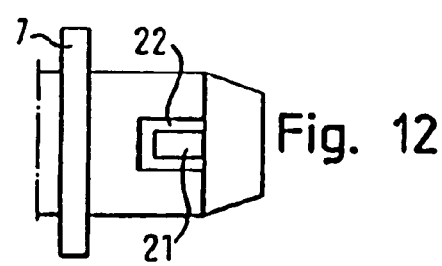

In the following the invention, further advantages of the invention and further features are explained in detail with respect to an embodiment. It shows:

FIG. 1 a perspective representation of the mounting device;

FIG. 2 a representation of the mounting wall with a boring;

FIG. 3 a representation of the mounting wall with a notch;

FIG. 4 a side view of the mounting device;

FIG. 5 a cross-section of the mounting device;

FIG. 6 a representation of the expanding ring with the operating mandrel shown in dashed lines behind;

FIG. 7 a first embodiment of the expanding ring;

FIG. 8 a second embodiment of the expanding ring;

FIG. 9 a third embodiment of the expanding ring;

FIG. 10 a fourth embodiment of the expanding ring;

FIG. 11 a cross-section of another embodiment of the mounting device;

FIG. 12 a representation of a first embodiment of an expanding tap;

FIG. 13 a further embodiment of an expanding tap; and

Figure 14:
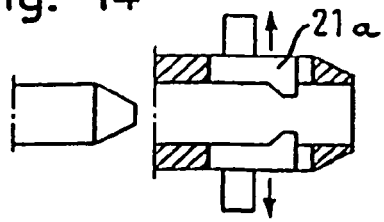

FIG. 14 a cross-section of the embodiment according to FIG. 13.

DETAILED DESCRIPTION OF THE INVENTION

FIG. 1 shows the mounting device 1 with the Bowden cable 2 including the interior cable 24. The mounting device 1 is inserted through a boring, as shown in FIG. 2, or a notch, as shown in FIG. 3.

The mounting device consists, as can easily be seen in FIGS. 4 and 5 of a hollow cylinder 6 and a cap 8. The hollow cylinder 6 comprises a slightly smaller diameter than the boring 3 or the notch 4 so that this part can be inserted through the boring 3 or the notch 4. The inserting movement is limited by a umbrella-like radially outwardly directed holding flange 7 which is an integral part of the hollow cylinder 6. The hollow cylinder 6 is at its front end beveled for easier insertion. In the front part of the hollow cylinder there are recesses for receiving a expanding element or an expandable fixing element.

In this embodiment the fixing element is provided as an expanding ring 15. The different embodiments of the expanding ring 15 are shown in the FIGS. 7 to 10.

The expanding ring 15a shown in FIG. 7 comprises ridges 16 directed to the inside. This type of expanding ring is also known under the term Simmering.

The expanding ring can also included a plurality of circumferentially spaced apart supporting members 7. Four evenly spaced supporting angles are connected to the expanding ring.

For a reinforcement in axial direction, a tube-like section 19 can be arranged at the expanding ring, as shown in FIG. 9. The embodiment of the expanding ring according to FIG. 9 comprises radially outwardly directed supporting ridges 18.

A further embodiment of the expanding ring is characterized by a substantially horseshoe-like form having a central area of reduced material 20, i.e., this embodiment has a thinner section.

The distance between the contact surface of the holding flange directed to the mounting wall 5 and the beginning of the expanding ring 15 corresponds to the thickness of the mounting wall 5.

As can be clearly seen in FIG. 5, the expanding ring extends in the released state, i.e., when it is not expanded by the operating element 9 into the interior of the hollow cylinder 6. The operating element 9 which is provided as a mounting mandrel with a conical operating surface 10 can expand the fixing element 15. To this end, the operating element 9 must be moved in the direction of the arrow E.

The operating element 9 is part of the cap 8. The interior diameter of the cap 8 is greater than the outer diameter of the hollow cylinder 6. The Bowden cable 2, i.e., its outer sheath is mounted to the cap 8. The inner cable 24 is guided through the operating element 9. The expanding ring 15 is expanded in the direction of the arrow D, when the operating element 9, that is, the cap 8 is inserted.

A spring element 12 or a spiral spring is arranged between the hollow cylinder 6 and the cap 8 so that the cap is pushed away, if it is not correctly connected to the hollow cylinder 6. This connection is achieved by a clip element 13 integrated into the cap 8, which engages a recess 14 arranged at the hollow cylinder 6. Further, a second recess 25 is provided for achieving a preliminary position. As can be seen in FIG. 4, the inner cable 24 of the Bowden cable carries at one end a fixing eyelet 26. Since the mounting device 1 is simply inserted, the fixing eyelet 26 remains at the correct position, that is, in the correct angular position.

The arrows G and F indicate additionally the contact surfaces of the holding flange 7 and the fixing element 11. G indicates the side contacting the holding flange 7.

The direction of the insertion of the mounting device is indicated in FIG. 4 with the arrow B.

The FIGS. 11 to 14 show two different embodiments which differ from the embodiments shown in FIGS. 4 and 5 insofar that two integrated expanding tabs 21/21a are arranged instead of the expanding ring 15. The advantage of this embodiment is that due to the expanding tape tabs 21/21a an additional part, i.e., the expanding ring, is no longer necessary. Each expanding tab 21/21a is formed from the material of the hollow cylinder 6.

In the embodiment shown in the FIGS. 11 and 12 the expanding tab 21 is formed by a U-shaped cut 22 wherein the beginning and the end of the cut are arranged close to the insertion beveling of the hollow cylinder 6 and wherein the expanding tab 21 is directed to the holding flange 7.

The present invention is not limited to the shown embodiments but also comprises embodiments with other operating elements, other fixing elements or another shape of the hollow cylinder. For example, the hollow cylinder 6 must not be exactly cylindrical. The fixing element 11 must not be elastical itself. It can, for example, be expandable by means of additional spring elements.

| List of reference numbers | |
|---|---|
| 1 | mounting device |
| 2 | Bowden cable |
| 3 | boring |
| 4 | notch |
| 5 | mounting wall |
| 6 | hollow cylinder |
| 7 | holding flange |
| 8 | cap |
| 9 | operating element |
| 10 | operating surface |
| 11 | fixing element |
| 12 | spring element |
| 13 | clip element |
| 14 | recess |
| 15 | expanding ring |
| 16 | ridges |
| 17 | supporting angles |
| 18 | supporting ridges |
| 19 | section |
| 20 | zone of reduced material |
| 21 | expanding tap |
| 22 | U-shaped cut |
| 23 | operating projection |
| 24 | inner cable of the Bowden cable |
| 25 | second recess |
| 26 | fixing eyelet |

The invention claimed is:

1. A mounting device for mounting a component at a bore or a notch in a mounting wall, the mounting device comprising
   a hollow cylinder axially insertable into the bore or notch;
   at least one fixing element carried by the hollow cylinder for movement from a radially retracted position permitting insertion of the cylinder into the bore or notch and a radially expanded position for engaging behind the mounting wall to prevent axial withdrawal of the hollow cylinder from the bore or notch; and
   a locking element axially movable along the hollow cylinder for radially expanding the fixing element to its radially expanded position for engaging the mounting wall from behind;
   wherein the hollow cylinder includes first and second recesses axially spaced from one another, the locking element includes a cap telescopically movable over the hollow cylinder, and the cap includes a clip element for engaging, when the cap is at a first position permitting insertion of the hollow cylinder into the bore or notch, the first recess in the hollow cylinder for temporarily holding the cap to the hollow cylinder at the first position of the cap, and the second recess in the hollow cylinder when the cap is at a second position where the locking element maintains the fixing element radially expanded for locking the cap to the hollow cylinder.

2. A mounting device according to claim 1, wherein the hollow cylinder comprises an integral holding flange for contacting a front side of the mounting wall, the holding flange is spaced from the fixing element for accommodating the thickness of the wall adjacent the bore or notch, and the locking element comprises an operating element having an operating surface for effecting expansion of the fixing element.

3. A mounting device according to claim 2, wherein the operating element is an operating mandrel and the operating surface is conical.

4. A mounting device according to claim 1, wherein a spring element is arranged between the cap and the hollow cylinder.

5. A mounting device according to claim 1, wherein the fixing element is an expanding ring.

6. A mounting device according to claim 5, wherein the expanding ring has inwardly directed ridges.

7. A mounting device according to claim 5, wherein the expanding ring includes a plurality of circumferentially spaced apart supporting members or ridges.

8. A mounting device according to claim 5, wherein the fixing element is provided with at least one tube section.

9. A mounting device according to claim 5, wherein the expanding ring is horseshoe shaped having a central zone of reduced material.

10. A mounting device according to claim 1, wherein the fixing element is formed by a radially expandable tab portion of the hollow cylinder.

11. A mounting device according to claim 10, wherein the expanding tab portion is formed by a U-shaped cut in the hollow cylinder, and the expanding tab is provided with an operating projection protruding into the interior of the hollow cylinder where it can be contacted by the operating surface of the operating element.

12. A motor vehicle comprising the mounting device of claim 1.

13. A mounting device according to claim 1, in combination with the component, the component is mounted to the locking element.

14. A combination according to claim 13, wherein the component is a Bowden cable.

15. A combination according to claim 14, wherein the locking element includes an axial center passage and the Bowden cable extends through the center passage.

16. A mounting device for mounting a component at a bore or a notch in a mounting wall, the mounting device comprising a hollow cylinder axially insertable into the bore or notch;

at least one fixing element carried by the hollow cylinder for movement from a radially retracted position permitting insertion of the cylinder into the bore or notch and a radially expanded position for engaging behind the mounting wall to prevent axial withdrawal of the hollow cylinder from the bore or notch;

a locking element axially movable along the hollow cylinder for radially expanding the fixing element to its radially expanded position for engaging the mounting wall from behind;

a cap on the hollow cylinder; and a spring element arranged between the cap and the hollow cylinder; and wherein the cap has a clip element for engaging a recess in the hollow cylinder for locking the cap to the hollow cylinder at a position where the locking element maintains the fixing element radially expanded.

* * * * *